United States Patent [19]
Drexler

[11] 4,314,260
[45] * Feb. 2, 1982

[54] LASER PYROGRAPHIC REFLECTIVE RECORDING LAYER IN A CARBON CONTAINING ABSORPTIVE MATRIX

[75] Inventor: Jerome Drexler, Los Altos Hills, Calif.

[73] Assignee: Drexler Technology Corporation, Mountain View, Calif.

[*] Notice: The portion of the term of this patent subsequent to May 26, 1998, has been disclaimed.

[21] Appl. No.: 131,288

[22] Filed: Mar. 18, 1980

Related U.S. Application Data

[63] Continuation-in-part of Ser. No. 60,913, Jul. 23, 1979, abandoned, which is a continuation-in-part of Ser. No. 12,235, Feb. 14, 1979, abandoned, which is a continuation-in-part of Ser. No. 921,723, Aug. 17, 1978, abandoned.

[51] Int. Cl.³ .................... G01D 15/10; G01D 15/34
[52] U.S. Cl. ................... 346/76 L; 346/135.1
[58] Field of Search ................. 346/76 L, 135.1

[56] References Cited

U.S. PATENT DOCUMENTS

| | | |
|---|---|---|
| 2,911,749 | 11/1959 | Stookey . |
| 3,314,073 | 4/1967 | Becker ............................. 346/76 L |
| 3,406,066 | 10/1968 | Avery . |
| 3,567,447 | 3/1971 | Chand . |
| 3,579,338 | 5/1971 | Ooue et al. . |
| 3,655,256 | 4/1972 | Claytor et al. .................... 346/76 L |
| 3,664,837 | 5/1972 | Stanley . |
| 3,665,483 | 5/1972 | Becker et al. ..................... 346/76 L |
| 3,674,484 | 7/1972 | Spinski . |
| 3,689,894 | 9/1972 | Laura et al. . |
| 3,893,129 | 7/1975 | Endo et al. ........................ 346/76 L |
| 3,911,444 | 10/1975 | Lou et al. .......................... 346/76 L |
| 4,059,445 | 11/1977 | Sato . |

OTHER PUBLICATIONS

Bartolini, R. A. et al., Review and Analysis of Optical Recording Media, Optical Engineering, vol. 15, No. 2, Mar./Apr. 1976, pp. 99–108.

*Primary Examiner*—George H. Miller, Jr.

[57] ABSTRACT

A recording medium for laser writing and a method of making same wherein a silver-halide emulsion coating disposed on a substrate is strongly exposed to actinic radiation and then developed, or otherwise processed for maximum blackness. The black opaque emulsion is converted to a reflective recording medium by heating at least to 270° C. in an oxygen containing environment until the emulsion coating assumes a shiny reflective appearance and the gelatin partially pyrolyzes creating a carbon containing absorptive matrix. Prior to developing, patterns may be photographically imposed on the medium to provide control indicia for the recording system or data base information to a playback system or to provide a means of replicating master recordings.

36 Claims, 8 Drawing Figures

LASER PYROGRAPHIC REFLECTIVE RECORDING LAYER IN A CARBON CONTAINING ABSORPTIVE MATRIX

CROSS REFERENCE TO RELATED APPLICATION

This is a continuation-in-part of application Ser. No. 60,913 filed July 23, 1979, now abandoned, which in turn is a continuation-in-part of application Ser. No. 012,235 filed Feb. 14, 1979, now abandoned, which in turn is a continuation-in-part of application Ser. No. 921,723 filed Aug. 17, 1978, now abandoned.

BACKGROUND OF THE INVENTION a. Field of the Invention

The invention relates to data storage media, and more particularly to a storage medium useful for directly reading laser writing immediately after laser writing.

b. Prior Art

Previously, many types of optical recording media have been developed for laser writing. For example, an article in *Optical Engineering,* Vol. 15, No. 2, March-April, 1976, p. 99 discusses properties of a large number of media. Some of these media require post write processing before they can be read, and some can be read immediately after laser writing. The media of interest herein are for "direct read after write" capability, commonly known as "DRAW" media. Presently known laser DRAW media are thin metal films in which holes may be melted, composite shiny films whose reflectivity at a spot may be reduced by evaporation, thin films of dyes or other coatings which can be ablated at a spot, and dielectric materials whose refractive-index may be changed at a point, causing a scattering of light when scanned with a read laser.

Today, these media are generally manufactured by means of vacuum deposition on a batch basis rather than continuous-flow basis and are therefore expensive and it is difficult to achieve a uniformity of quality for large production quantities of the product since many batches would be involved. Refractive-index-change materials which have been proposed for future manufacture on a continuous basis have the disadvantage that in order for these media to be read by reflection, a metal undercoating must be applied, thereby introducing a batch type production process with the above mentioned disadvantages.

The most common DRAW media are thin metal films, usually on a glass substrate. Thin metal films have several advantages: First, they can be produced easily in small quantities with commercially available sputtering equipment. Second, they can be read either by reflection or by transmission. Third, films of tellurium and bismuth have relatively high recording sensitivities.

Fortunately, for all of these reasons, metal films have enabled a large amount of research to be conducted and progress to be made in the design of optical data storage systems. To date, tellurium has evolved as the most widely used of the metal films. However, tellurium must be manufactured by an expensive, batch-type, vacuum sputtering technique; it does not form a tenacious coating; and it introduces manufacturing and environmental complications because of its toxicity.

In U.S. Pat. No. 3,911,444 Lou, Watson, and Willens disclose a vacuum-deposited metal film recording media for laser writing incorporating a separately deposited plastic film undercoat between the metal film and a flexible transparent substrate in order to require less energy to write with a laser and to prevent impurity transfer between the substrate and the radiation absorbing film.

In Example I of U.S. Pat. No. 3,567,447 Chand discloses that upon heating a processed silver-halide emulsion coated photoplate, the non-image areas, clear gelatin, darkened to a transparent reddish color and the image areas assumed a reflective metallic sheen. Chand used the reddish color to delineate non-image areas to be removed chemically, thereby leaving hardened opaque image areas, with clear non-image areas.

In U.S. Pat. No. 3,893,129 Endo discloses exposed and partially developed film for recording laser writing by means of heating the film to cause local deformations which scatter light.

In U.S. Pat. No. 3,689,894 Laura and Eng disclose exposed and developed microfilm to record data by optically writing transparent bits of data in black areas of the microfilm by burning holes through the black silver-halide emulsion.

In U.S. Pat. No. 3,314,073 C. H. Becker discloses exposed and developed microfilm to record data by optically writing transparent bits of data in black areas in microfilm by burning holes through the black silver-halide emulsion.

Many other patents reveal light absorptive media for recording laser writing. My objective was to devise a moderately reflective DRAW laser recording material which may be manufactured without the use of a vacuum system and on a continuous basis and which may be used to record low-reflective spots in a reflective field with relatively low energy laser pulses. Another objective was to devise a laser recording medium which permits the pre-recording of control indicia and certain data base data by normal photographic means to facilitate the use of discs or plates in both the recording apparatus and the playback apparatus.

SUMMARY OF THE INVENTION

The above objectives have been met with the discovery that a laser recording medium having a shiny reflective surface may be produced by thermally converting a processed photographic silver-halide emulsion. It was also discovered that the thermal conversion process also leads to a partial pyrolysis of the gelatin creating free carbon molecules which increase the absorption of the laser light thus converting more of the writing laser beam energy to heat energy thereby increasing the recording sensitivity of the media. The emulsion coated substrate is processed to an opaque black coating, then heated in an oxygen containing environment until a shiny reflective component appears on the surface of the emulsion. Temperatures between 280° C. and 340° C. are preferred to produce the reflective coating during a time cycle on the order of one-half minute to 20 minutes. Heating methods include the use of a convention oven, a contacting hot source, or radiant heating. A resulting shiny reflective emulsion coated transparent or absorptive substrate is a DRAW laser pyrographic reflective recording medium.

An advantage of the recording medium of the present invention is that it may be made on a continuous flow basis. The emulsion coating is tenacious with respect to its substrate and is not toxic when laser writing ablates portions of the coating. Another advantage is that the emulsion coating may be previously exposed to desired patterns by normal photographic means to provide control indicia for the recording apparatus and/or playback apparatus and for replication of master disc recordings.

DESCRIPTION OF THE PREFERRED EMBODIMENT

Figure 1:
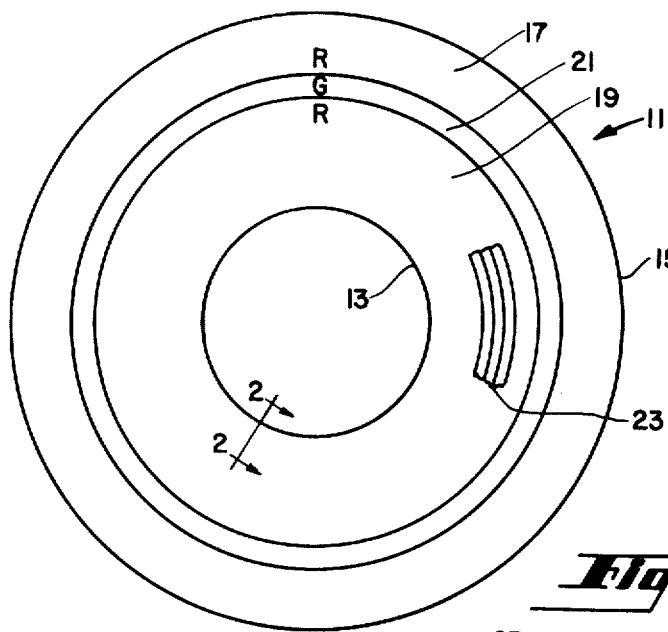
FIG. 1 is a top plan view of the recording medium of the present invention.

FIG. 1 shows a disc 11 having an inner periphery 13 and an outer periphery 15. The interior of the inner periphery 13 is void so that a centering collar may be used to hold disc 11 on a spindle for high speed rotation. While the recording medium of the present invention is described as a disc, a disc configuration is not essential for operation of the recording medium. For example, the recording medium may be a flat sheet-like material which could be square and with a central hub rather than a hole. It could also be a non-rotating rectangular plate. However, rotating discs are preferred for fast random access to medium amounts of data and non-rotating rectangular plates in stacks are preferred to provide intermediate speed random access to large amounts of data by mechanically selecting a plate and scanning it by mechanical and electro-optical means.

The disc of FIG. 1 is photographically partitioned into recording and non-recording areas. For example, a first annular recording zone 17 could be spaced from a second annular recording zone 19 by an annular guard zone 21. The function of the guard zone may be to separate different recording fields, to carry control information, such as timing signals and to provide space for data read-write transducers to reside when not over recording areas. While such guard bands are preferable, they are not essential to the operation of the present invention. It should be noted that the recording fields are for data and control signal recording, while the guard band is not for data recording, but may have control signal recording thereon. The recording field 19 is shown to have a plurality of concentric, circumferentially-spaced servo tracks 23 thereon. Such servo tracks are thin lines which define the spaces between circular paths wherein data are written. The pattern for such lines is applied photographically as explained below with reference to FIGS. 3-7.

Figure 2:
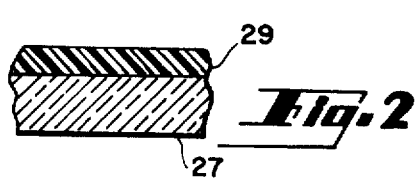
FIG. 2 is a side sectional view of the recording medium of FIG. 1.

FIG. 2 shows a side sectional view of the recording medium of FIG. 1. The medium consists of a substrate 27 which is a sheet-like layer which is transparent, translucent, or opaque; preferably a high temperature, dimensionally stable material, like glass, ceramic, and thermoset and thermoplastic polyimide plastics. One of the requirements of the substrate material is that it withstand temperatures to at least 280° C. and most likely 320° C. but up to 340° C., without thermal deformation. Transparency or absorptivity of the substrate is desired so that when the light beam of the reflective playback apparatus impinges upon a recorded spot, it either passes through the substrate or is absorbed by it with minimum reflection. If the substrate is absorptive, it may be absorptive at the wavelengths of the recording beam or the reading beam, or both. Thus, not all common photographic substrates may be used. For example, the most common photographic film bases are polyester polyterephthalate, polycarbonate, or cellulose triacetate—which normally have maximum continuous operating temperatures of 145° C., 132° C., and 205° C., respectively. Further, in order to coat a photographic emulsion on a substrate, it must be etchable, dimensionally stable, non-destructible by sunlight, have good mechanical strength, and should also be relatively inexpensive and currently available in adequate quantities. Further, when data recordings are to be read only in reflection rather than transmission, the substrate may be a low-reflecting, opaque material. There is one plastic-polyimide-that meets all of these conditions. It is available as a thermo-plastic and a thermoset plastic, can operate at 320° C. for minutes, and is etchable with alkalines.

Figure 8:
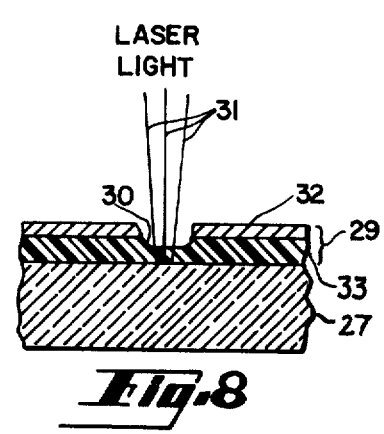
FIG. 8 is a side sectional view of the recording medium of FIG. 1 showing laser writing.

The thickness of the substrate is not critical when the laser beam is directed onto the surface as shown in FIG. 8, but it should have sufficient thickness to provide strength for resistance against breakage. If the laser beam is directed through a transparent substrate, then in order to maintain focus of the beam the thickness of the transparent substrate would have to be very uniform (for example, as obtainable from float glass or selected high quality drawn glass). Also, the thickness of the substrate may depend on the overall size of the recording medium being used. For a 12-inch disk, a thickness of ⅛ inch may be suitable.

The purpose of substrate 27 is to support a silver-halide emulsion coating 29, which is uniformly applied to the substrate in a conventional manner and which is converted subsequently to layers 32 and 33 in FIG. 8. Currently available silver-halide emulsions from 3 to 6 microns thick are adequate, provided they are characterized by very fine silver-halide grain size, i.e., only a small percentage of the grains are larger than 0.07 microns. This grain size appears to be important because when grain sizes become larger than approximately 0.06 microns the conversion from black to reddish coloration, which subsequently becomes metallic, appears to be less complete. Emulsion coated glass plates having these characteristics are commercially available and are known as photoplates which are used to make photomasks for the manufacture of semiconductor integrated circuits. For example, emulsion coated photoplates suitable for use herein are manufactured by Agfa-Gevaert of Belgium, Konishiroku Photo Industries of Japan and the Eastman Kodak Company.

The shiny reflective component 32 in FIG. 8 results from the thermal processing described herein and reflectivity does not initially exist in the emulsion. At the inception the material of reflective component 32 is mostly, excepting oxygen, all found in the photographic emulsion 29, which is uniform in its composition. A subbing layer, not shown, is usually used to attach the substrate 27 to the emulsion 29. Following the thermal conversion of the present invention the emulsion 29 of FIG. 2 produces a reflective component 32 at the emulsion surface shown in FIG. 8, with a low-reflective underlayer 33 beneath it. The reflective component 32 is not well defined in thickness, but exhibits a silver concentration gradient, with most of the silver near the surface, and less extending downwardly. Thus, although FIG. 8 depicts a sharp boundary for reflective component 32, actually such is not the case and is only pictured in this manner to explain the contrast which exists between the surface of the material and the underlying emulsion. The presence of more silver particles at the surface and less below after heating is surprising and not completely understood. It is believed that heat causes breakup of filamentary silver particles into much more mobile, smaller particles which, in the presence of oxygen at the surface concentrate and become reflective.

Underlayer 33, while not completely depleted of silver, contains less silver than reflective component 32. Optically, underlayer 33 is partially transmissive to red light having wavelengths of 630 nanometers and longer, so that once craters are created penetrating reflective component 32, the craters may be detected by transmission of red light through the underlayer 33, provided that the opacity of the reflective layer is sufficiently great at the selected wavelength to permit detection of the craters through differences in light transmission. The data contained in the craters may also be read by changes in reflectivity of the shiny reflective component throughout the visible spectrum and into the near infrared where it is ultimately limited in its usability as it becomes more and more transparent and therefore less reflective in the non-data areas.

It should be noted that both the recording areas 17, 19 and the non-recording guard band 21 of FIG. 1 have silver-halide emulsion covering a glass substrate. Thus, the designation of recording and non-recording areas is arbitrary and the entire surface could be used for recording if desired. However, as a matter of convenience, it is preferable to designate areas as non-recording areas. The boundaries between recording and non-recording areas may be defined by concentric lines, just as the servo tracks 23 of FIG. 1, which have been greatly enlarged in the Figure, may be defined by lines. Typically, servo tracks are closely spaced concentric circles or adjacent lines of a spiral, with data being written on or between the lines. Such servo track lines, as well as line boundaries for non-recording areas, may be photographically recorded on the recording medium prior to any data recording. Moreover, other alphanumeric information or data base information which is to be a permanent part of the recording medium also may be applied to the recording medium at an early time in the processing cycle since it becomes a permanent part of the recording medium.

One of the advantages of the present invention is that the permanent information to be recorded on the recording medium of the present invention may be applied by photographic techniques since the starting material for the recording medium is an unexposed commercially available photoplate used in the manufacture of semiconductor integrated circuits. After thermal conversion this information may be read in reflection since the black image areas will become highly reflective and the clear non-image areas will be only slightly reflective.

Figure 3:
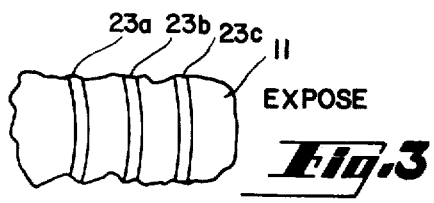
Figure 7:
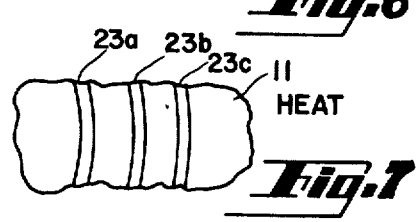

The photographic techniques which may be used to pre-record data base and control information are well known in the semiconductor industry. Lines having a thickness of one micron may be made. The typical procedure for creating a line pattern is illustrated in FIGS. 3–6. With reference to FIG. 3, the medium 11 is exposed to a line pattern consisting of the circular lines 23a, 23b and 23c. The line pattern exists as a latent image in the silver-halide emulsion, the remainder of which is unexposed to light.

Figure 4:
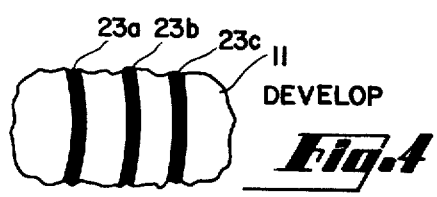

FIG. 4 illustrates the processing of the plate 11 through a well known commercially available developer which causes the image pattern of lines 23a, 23b, 23c to become black, characteristic of black silver, the remainder of the material being transparent.

Figure 5:
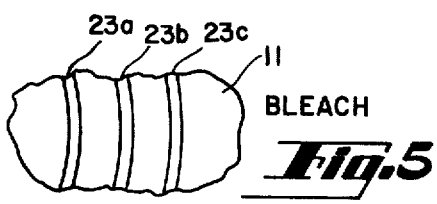

In FIG. 5, the developed silver areas 23a, 23b, 23c are bleached out so that they are clear. The bleach does not affect the unexposed zones of the recording material 11.

Figure 6:
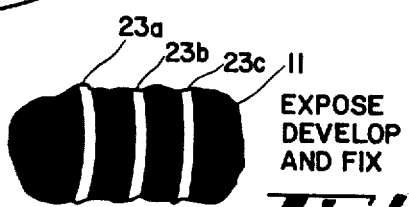
FIGS. 3-7 are detail views of the recording medium of FIG. 1 showing sequential processing steps for making the finished recording medium.

In FIG. 6, the entire recording medium is now strongly exposed to actinic radiation, such as by a mercury arc lamp, incandescent lamp or xenon flash lamp, as is done in reversal photographic processing, and developed for maximum blackness (fixing is optional). The object of this step is to provide black zones for conversion into the reflective data recording fields. Of course, the guard zone 21 in FIG. 1 between recording fields will also have the same black character, only its use is different. This exposure, development and fixing step would be the only processing procedure taken, prior to heating, if there were no information to be pre-recorded, such as the servo tracks 23a, 23b, 23c and there were no other pre-recorded alphanumeric or control indicia. In fact if no images are to be photographically recorded a fogging developer could be used in some cases to avoid the need for the exposure step. Fogging developers are known for use in reversal processing where it is desired to develop all remaining silver in a silver-halide emulsion. See "The Theory of the Photographic Process", 4th Ed., MacMillan (1977) p. 422. The minimum extent of blackness opacity must be such that the reflective component 32 subsequently produced by thermal conversion is adequately reflective to the wavelength of light used in reflective playback. A thin reflective component with adequate reflectivity, less than 0.5 micron thick is preferred in order to minimize energy needed to punch through the coating for laser pyrographic writing.

As an alternative to wet chemical development for creating black emulsion, dry thermal development may also be used. In thermal development, a latent image is developed by heating an exposed photosensitive thermographic material. Various types of materials exist, but in each case very mild heating causes development. Heating to about 115° C. for five seconds causes development in typical thermographic materials. One type of material which may be thermally developed contains a developer composition together with silver-halide grains. Heating causes the developer to become activated, sometimes using moisture derived from the emulsion carrier. In either instance, whether a chemical developer or a dry developer is used, the photographic emulsion is processed for maximum blackness.

Once the recording medium has achieved the described level of blackness, with or without pre-recorded indicia thereon, thermal conversion into a reflective medium may commence by heating the emulsion coating to a temperature of approximately 280° C. to 340° C. in air, or 250° C. to 340° C. in oxygen, until a shiny reflective component 32 in FIG. 8 appears at the upper surface. In order to partially pyrolyze the gelatin, thereby creating an absorption amber or reddish underlayer, a minimum temperature of at least 270° C. is preferred. The coating initially is first converted to a dark cherry red transmissive medium. This conversion, indicated in FIG. 7, begins to occur at temperatures as low as 200° C. At higher temperatures, specifically at about 300° C. the coating starts to become reflective in less than a minute. After further heating, reflectivity is clearly evident at the upper surface and the material 11 has a characteristic gold color. Electrical resistance measurements on the shiny component 32 in FIG. 8 indicate no measurable conductivity. Heating methods include the use of a convection oven, contacting hot source or radiant heating. Radiant heating is preferred because it heats the emulsion fast and uniformly and can be programmed easily to minimize thermal shock to the substrate.

The shiny component 32 also has low thermal conductivity. It is believed that silver grains which form the shiny component 32 are individually separated from each other by gelatin. In other words, the mild temperatures used in thermally converting the emulsion coating into a shiny component 32 are low enough to preserve the insulative properties of the gelatin. Higher temperatures could severely char or burn the gelatin, perhaps removing it by ablation. It appears that the mild temperatures used herein are adequate for partial pyrolysis of the gelatin and to stimulate silver grain breakup, and cause a dispersion of the grains which appears to be necessary for the creation of the reflective layer.

The oxygen component of the heating atmosphere is preferably maximized because it lowers both the temperature and the time required for processing. Although heating in air will work, a pure oxygen environment is better. A minimum percentage of oxygen, at least a few percent and preferably much more, such as the substantial percent of oxygen found in air, is necessary to create the shiny silver component 32 by thermal conversion.

At a minimum, the shiny reflective component must be visible on the surface of the material to be useful for reading the data by differential reflectivity. However, in some instances it may be desirable to have a thicker coating of the shiny material; in this instance longer heating would be required. For example, in the instance of thermally converting the entire thickness of the coating, heating for above 20 minutes is needed. Conversion may occur at temperatures between 280° C. and 340° C. The higher the conversion temperature, the faster the reaction and the more complete conversion; however, 320° C. is selected as a preferred maximum temperature so as to prevent severe charring of the gelatin in the emulsion coating and to minimize possible thermal damage to the substrate. Moderate charring or pyrolysis of the gelatin is noted by an amber color in the material. Note that the shiny component 32 only occurs where black silver previously existed. The shiny component is thus derived from the silver in the developed silver-halide emulsion. When the silver appears at the surface and is concentrated there, the thickness of the shiny component is not well defined because of a silver concentration gradient diminishing toward the direction away from the exposed surface. It was shown above that when reversal processing is used, certain black silver areas could be removed by bleaching in order to leave control indicia or line boundaries. Clear indicia markings of simple types can also be introduced by a negative processing procedure in which a mask or an intermittent beam is used to create the black images which outline the clear indicia.

While a silver-halide emulsion is the starting material for the recording medium of the present invention, the finished product is considered to be silver particles distributed within the gelatin, the halides being substantially removed in the exposure and development process. The finished product is characterized by a reflective silver component at the surface thereof having a silver gradient with more silver at the surface and less below, but with some silver throughout the gelatin.

To use the recording medium of the present invention laser light is focused on a spot at the surface of the coating of the recording medium. Enough laser energy is delivered to the spot to remove the shiny reflective material. The shiny material is primarily at the surface and since a reflective read procedure is used, for example as described in U.S. Pat. No. 3,657,707, the recording laser beam need only penetrate and remove the shiny coating—not the full depth of the emulsion coating. Transmissive type reading can be accomplished to a limited extent if a red or very near infrared laser beam is used such that the opacity of the coating blocks 90% of the light and the recorded craters permit transmission of at least 50% of the light.

FIG. 8 shows emulsion coating 29 on substrate 27 covered by shiny component 32 having a crater 30 damaging the shiny component created by means of laser light indicated by the rays 31. The size of the craters is kept at a minimum, preferably slightly under one micron in diameter but no larger than a few microns in diameter to achieve high data densities. Data written by means of laser light are recorded in the recording areas 17, 19 shown in FIG. 1, designated by the letter R. As mentioned previously, these recording areas may also contain pre-recorded data base data and control indicia which may be disposed over essentially the entire area of the medium. No data is recorded in the guard band 21, designated by the letter G, although this region may have control indicia written therein. Control indicia in either of the areas may be written by means of photographic techniques or by pyrographic methods such as laser writing.

Thus, the recording medium of the present invention may contain a mix of pre-recorded data and control indicia which has been applied to the recording medium by photographic techniques, as well as subsequently written data applied to the recording medium by laser pyrographic writing. There is no data storage distinction between pre-recorded low-reflective spots and low-reflective spots made by laser writing. In the read mode, data base data and control information are accessible on the same disc as data, while in the record mode the control information is used.

The table below lists the relative contrast measurements obtained from laser writing and reading as shown in FIG. 8 on a sample of this laser pyrographic reflective recording medium on a glass substrate. Measurements were made by recording and reading 32 spots at each of 12 power levels, or a total of 384 spots, with an argon laser generating the green 514 nanometer line. Electron micrographs and optical microscope photographs were taken of the holes created. These photos confirmed that the depth of the holes at rated power levels is considerably less than the 0.8 micron hole diameter itself; also, that at the lower power levels the holes are reduced in size. The table illustrates that the contrast is almost unchanged from power levels of 24.3 milliwatts down to 6.9 milliwatts, indicating that as long as the power is above the required level, the material performs well. Note that there is little further degradation in contrast down to 4.6 milliwatts. Finally note that the usable contrast (when the median contrast is much larger than the 1 Sigma distribution value) is as low as 2.8 milliwatts. From these data it can be concluded that the medium could be rated at 5 milliwatts for 0.8 micron beam recording with 100 nanosecond pulses.

The above described reflective recording medium can be produced by using a photoplate coated with a commercial Agfa-Gevaert Millimask HD emulsion 4.5 microns thick. It is exposed for one to several minutes in room light and then developed in a high energy or high contrast developer and then fixed. It is desirable that the obtained optical density to white light be about 2.5 or higher to achieve reflectivities of at least 15% after reasonable thermal conversion times and temperatures. The black photographically processed silver-halide emulsion was then thermally converted at 320° C. in oxygen for five minutes to achieve a reflectivity in the range of 15% to 16%. A typical high contrast developer would have the following ingredients: hydroquinone, 8 grams; sodium sulfite, 69 grams; potassium hydroxide, 7 grams; potassium bromide, 2.5 grams; benzotriazole, 0.018 grams; and then add water to make one liter. Such reflective laser recording media have also been produced using commercially available high resolution photoplates normally used for making semiconductor photomasks and manufactured by Eastman Kodak Company and by Konishiroku Photo Industries Co. Ltd. as well as by Agfa-Gevaert as described above.

It has been discovered that the thermal conversion processing step plays another important role in creating a reflective laser recording medium. In addition to the conversion of the black low-reflective filamentary silver to shiny metallic non-filamentary silver, the heating of the gelatin at 270° C. and higher also leads to a partial pyrolyzing of the gelatin which creates light absorbing carbon molecules on the gelatin. These carbon molecules increase the absorptivity of the gelatin to the light emanating from the writing laser beam, thus increasing the heating effect and thereby the recording sensitivity of the medium. That is, less laser power will be necessary to melt the reflective component if the gelatin absorbs more light energy. Experiments have shown that photographic gelatin 3 microns thick, heated for five minutes in air at 276° C. will absorb 65% of the blue light at 488 nanometers and 16% of the red light at 633 nanometers. When the heating is at 316° C., other conditions remaining the same, the absorption at 488 nanometers rises to 90% and the absorption at 633 nanometers rises to 45%. The absorption to visible wavelength and very near infrared increases with both temperature and heating time as would be expected for a pyrolyzing process.

The above described reflective recording medium requires much less laser energy and creates considerably less recording debris, which can be a source of data errors, than prior media in which holes were burned through one to six microns of black silver-halide emulsion. The recording method herein described results in melting, distortion and removal of approximately 0.25 to 0.5 micron of the reflective layer created by the thermally converted emulsion. Thus, the laser energy required and the debris generated are reduced by a factor of four to ten by my recording method and medium, which also permits the widely used method of reflective reading of the data with a laser.

Note that the thermally converted processed silver-halide emulsion under the reflective coating, 33, plays a thermal insulating role in improving recording sensitivity similar to what is accomplished by the plastic film undercoat of the prior art. However, the present coating method does not require the added step of a batch-type vacuum deposition procedure. A continuous flow manufacturing process may be used to produce both the reflective layer and the thermal insulating undercoat.

TABLE

LASER WRITING AND READING ON PYROGRAPHIC REFLECTIVE RECORDING MEDIUM

| Laser Beam: | 514 Nanometers Wavelength |
| | 0.8 Micron Diameter |
| | 100 Nanosecond Pulses |

| Pulsed Power at Surface of Recording Medium (in Milliwatts) | Relative Contrast Ratio Averaged Over 32 Spots | Statistical Distribution of Contrast Ratios of the 32 Spots ($\pm$ 1 Sigma) |
|---|---|---|
| 24.3 | 2619 | $\pm$ 190 |
| 21 | 2548 | $\pm$ 267 |
| 18 | 2468 | $\pm$ 519 |
| 15.4 | 2597 | $\pm$ 894 |
| 12.8 | 2726 | $\pm$ 531 |
| 10.4 | 2608 | $\pm$ 617 |
| 8.7 | 2675 | $\pm$ 320 |
| 6.9 | 2513 | $\pm$ 364 |
| 5.7 | 2179 | $\pm$ 597 |
| 4.6 | 2193 | $\pm$ 341 |
| 3.6 | 1882 | $\pm$ 444 |
| 2.8 | 1268 | $\pm$ 3883 |

What is claimed is:

1. An information storage medium for pyrographically recording laser writing comprising a reflective surface coating of at least 15% reflectivity disposed on a sheet substrate, the reflective coating comprising reflective silver particles distributed within a gelatin matrix.

2. The information storage medium of claim 1 wherein said reflective coating has a reddish or amber color underlayer disposed between said reflective coating and the substrate.

3. The medium of claim 2 wherein said reddish or amber color is derived from carbon molecules.

4. The information storage medium of claim 1 or 2 wherein said substrate is capable of withstanding temperatures of at least 270° C.

5. In laser pyrographic information recording and storage, the recording and storage medium comprising,
a sheet substrate capable of withstanding temperatures of at least 270° C., said substrate supporting a photographic gelatin coating, said gelatin coating having silver particles distributed within a gelatin matrix, said gelatin matrix optically characterized by a surface reflective silver component of at least 15% reflectivity thereon and an underlying reddish or amber color derived from unreacted carbon molecules.

6. The medium of claim 5 wherein said reflective silver component has a concentration gradient whereby the silver concentration is greatest at the surface of said component and diminishes in a direction away from said surface.

7. The medium of claim 5 wherein said reflective silver component extends throughout said coating.

8. The recording and storage medium of claim 5 wherein said gelatin matrix contains a density of carbon molecules sufficient to create an optical absorptivity at 633 nanometers of at least 10%.

9. The medium of claim 5 wherein said substrate is transparent.

10. The medium of claim 5 wherein said substrate is absorptive of radiation of wavelengths of a recording beam.

11. The medium of claim 5 wherein said substrate is absorptive of radiation of wavelengths of a reading beam.

12. The medium of claim 5 wherein said substrate is absorptive of radiation of wavelengths of both a recording beam and a reading beam.

13. A medium of claim 5 wherein substrate is glass.

14. The medium of claim 5 wherein the substrate is ceramic.

15. The medium of claim 5 wherein the substrate is a thermoset polyimide plastic.

16. The medium of claim 5 wherein the substrate is a thermoplastic polyimide plastic.

17. The medium of claim 5 wherein said photographic emulsion is of the type used in the manufacture of photomasks for semiconductor integrated circuits.

18. The medium of claim 5 wherein said photographic gelatin coating comprises silver grains having primarily grain sizes less than 0.07 microns.

19. A method of making a laser pyrographic information and storage medium comprising,
  photographically processing a silver-halide gelatin coating on a substrate to blackness, and
  thermally converting said black photographically processed silver-halide gelatin coating by heating at least to 270° in an atmosphere having a substantial percentage of oxygen at least until a reflective component of at least 15% reflectivity appears on the emulsion coating.

20. The method of claim 19 wherein said heating is carried out in an oxygen atmosphere.

21. The method of claim 19 wherein said heating is carried out in air.

22. The method of claim 19 wherein said heating is carried out at least until the gelatin is pyrolyzed to the extent that the gelatin has at least a 10% optical absorptivity at 633 nanometers.

23. The method of claim 19 wherein said heating is by means of radiant heating.

24. The method of claim 18 wherein said step of photographic processing includes photographically defining in the emulsion areas for recording data by laser pyrographic means and areas set aside for no laser pyrographic recording.

25. The method of claim 18 wherein said step of photographic processing includes photographically defining in the emulsion lines defining servo tracks.

26. The method of claim 18 wherein said step of photographic processing includes photographically defining in the emulsion lines defining control indicia.

27. The method of claim 24 wherein said step of photographic processing includes recording data base data indicia in a photographically defined area set aside for no laser pyrographic recording.

28. The method of claim 19 wherein said heating is carried out for a time of between one-half minute and 20 minutes.

29. The method of claim 19 wherein said heating is carried out for a time of between four and six minutes.

30. The method of claim 19 wherein said step of photographically processing said silver-halide emulsion is by applying a fogging developer.

31. The method of claim 19 wherein said blackness of said processed emulsion coating has an optical density to white light of 2.5 or greater.

32. The method of claim 19 wherein said step of photographically processing said silver-halide emulsion is further defined by the steps of
  exposing said silver-halide emulsion coating on a substate to actinic radiation, and
  developing said silver-halide enulsion coating.

33. The method of claim 32 wherein said developing is by heating.

34. The method of claim 32 wherein said developing is by chemical means.

35. The method of claim 34 wherein said developing by chemical means is by negative processing.

36. The method of claim 34 wherein said developing by chemical means is by reversal processing.

* * * * *